Patented June 21, 1938

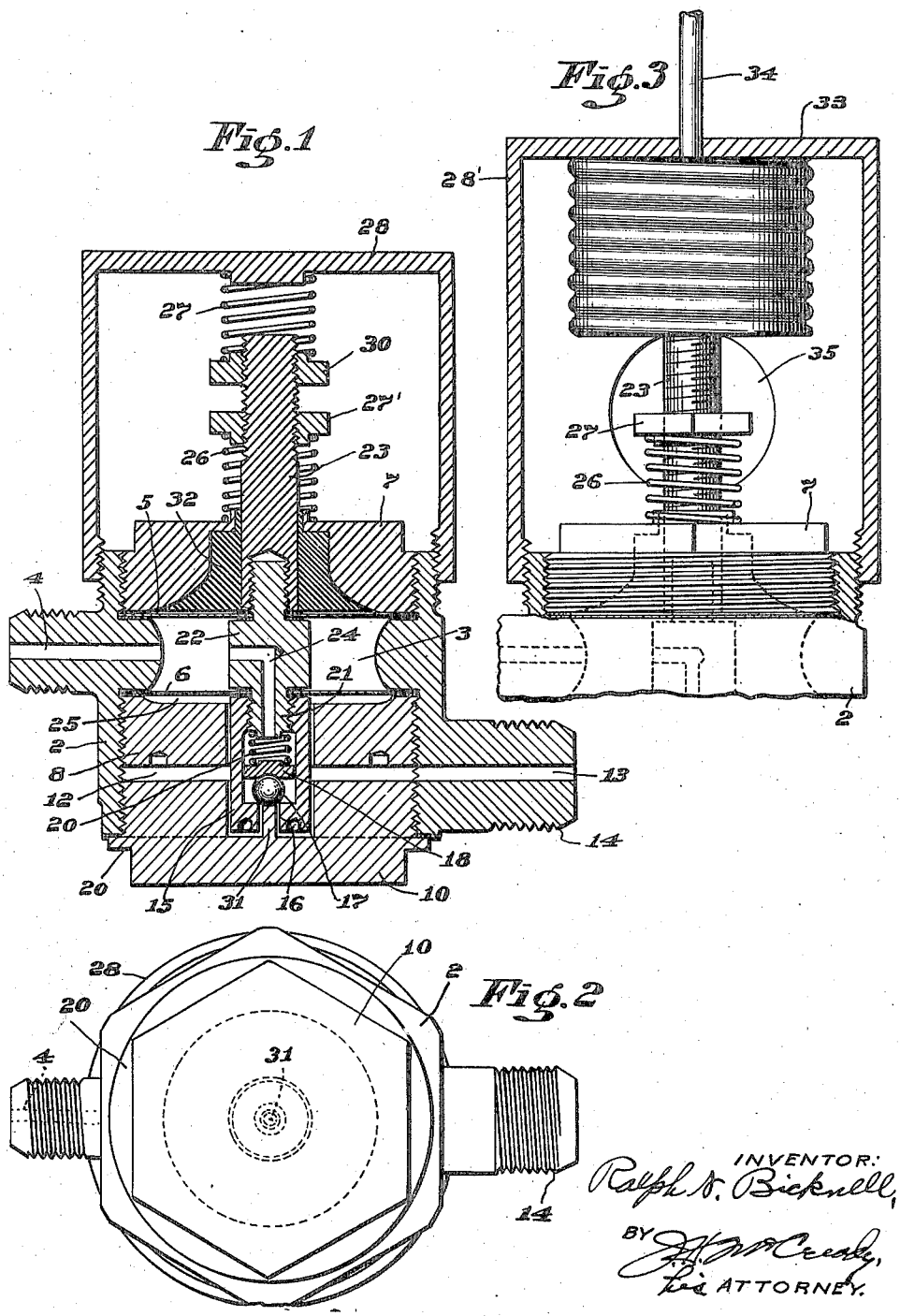

2,121,312

UNITED STATES PATENT OFFICE 2,121,312

REGULATING VALVE FOR REFRIGERATING SYSTEMS

Ralph N. Bicknell, Bangor, Maine

Application November 16, 1935, Serial No. 50,179

7 Claims. (Cl. 50—23)

In refrigerating systems of the expansion type a regulating valve is provided to control the flow of the high pressure refrigerant into the expansion coil. The present invention relates to valves of this type and it aims to improve such valves with a view to devising a more reliable construction, reducing the cost of manufacture of these devices, facilitating repairing operations, and providing a valve which will be substantially non-frosting. It is also an object of the invention to devise a valve which can readily be adapted for either automatic operation by the pressure conditions in the system, or for use with a thermostatic control.

The nature of the invention will be readily understood from the following description when read in connection with the accompanying drawing, and the novel features will be particularly pointed out in the appended claims.

In the drawing,

Figure 1 is a vertical, sectional view of a valve constructed in accordance with this invention;

Fig. 2 is a bottom view of the valve shown in Fig. 1; and

Fig. 3 is a vertical, sectional view illustrating a part of the valve shown in Fig. 1 when modified for thermostatic control.

Referring first to Figs. 1 and 2, the construction there shown comprises a valve casing 2 in which a high pressure chamber 3 is provided. Refrigerant is admitted to this chamber through an inlet 4 designed for the convenient connection thereto of a pipe or tube leading from the compressor. The top and bottom surfaces of the chamber 3 consist of two flexible diaphragms 5 and 6, respectively. While the material of which these diaphragms is composed necessarily will be determined somewhat by the nature of the refrigerant used, I consider it usually preferable to make them of stainless steel. These diaphragms are approximately circular in outline, and they rest at their margins on seats provided for them in the casing. The upper diaphragm is locked in its seat by a screw threaded plug 7 and the lower diaphragm is similarly secured by another plug 8, suitable gaskets being interposed between the margins of the diaphragms and their seats and the plugs to prevent any possibility of gas leaking around them.

The opening in the lower end of the casing into which the plug 8 is screwed is normally closed by a removable plug 10, and these plugs are separated by a space 12 which forms a part of the low pressure chamber and communicates directly with the outlet 13 in the nipple 14.

In order to control the flow of refrigerant from the high pressure chamber 3 into the low pressure chamber 12, a valve structure is mounted on the two diaphragms and comprises a housing 15, provided with a passage 16 through the lower end thereof, and with a valve seat at the upper end of this passage to cooperate with a ball plunger 17. A follower 18 bears on this ball and is backed up by a spring 20, these two parts tending to hold the ball normally in its seat and thus to close the valve. This whole valve structure is threaded onto a nipple 21 projecting downwardly from the lower end of a plug 22, to the upper end of which a valve stem 23 is secured. The plug connects the two diaphragms, the upper diaphragm 5 being clamped between the plug and the stem, and the lower diaphragm being similarly secured between the plug and the valve housing member 15. Suitable gaskets encircle the threaded stems of the plug, both above and below the diaphragm, to seal the joints at these points. Extending through the plug is a passage 24 through which the high pressure refrigerant flows from the chamber 3 into the valve housing and to the valve seat.

It will be observed that in this arrangement both the diaphragms 5 and 6 are in contact with the high pressure refrigerant and that the pressure on one diaphragm tending to move the valve structure bodily, up or down, is opposed by the action of the pressure on the other diaphragm. Thus they exert a balancing action on each other. Also, the lower diaphragm 6 separates the high pressure and low pressure chambers, and the construction is such that the low pressure refrigerant flows freely around the valve 15 and into the space 25 cut out of the plug 8 immediately below said diaphragm. Consequently, the action of the high pressure on the upper surface of this diaphragm is opposed in some measure, also, by the pressure in the chamber 25. These opposing pressures can be counter-balanced, and their effects varied, by adjustment of two coiled springs 26 and 27, the lower of these springs encircling the stem 23 and being confined between the plug 7 and an adjustable nut 29 threaded on said stem, while the upper spring abuts at one end against the casing cap 28, and at its lower end against a nut 30, also threaded on the stem 23.

The bodily movement of the valve casing 15 up or down under the action of these pressures and springs is utilized to operate the valve, the plug 10 previously referred to being provided with a central pin 31 projecting upwardly therefrom, through the hole 16, and terminating at such a point that when the valve is moved downwardly far enough to bring the ball plunger 17 into contact with the upper end of the pin, the ball then will be lifted off its seat and thus allow refrigerant to flow through the valve structure into the low pressure chamber 12 and through the outlet 13.

When this valve is used in the particular form shown in Figs. 1 and 2, it operates entirely in response to the difference in pressure in the high pressure and low pressure chambers. Assuming the valve has just been opened in the manner above described, refrigerant will continue to flow through it and into the expansion coil so long as the refrigerating unit remains in operation; but when said unit is shut down by the thermostat in the refrigerator, a back pressure is built up sufficiently to cause the lower diaphragm to raise the valve casing 15 far enough to lift the ball 17 off the pin 31. This closes the valve. It does not open again until the compressor starts up and the back pressure has been reduced sufficiently to produce a lowering movement of the entire valve structure, including the members 15 and 17, and thus to cause the opening operation above described to be repeated.

The back pressure at which the valve will be closed can be predetermined by making suitable adjustments of the springs 26 and 27, as above described.

There is a tendency for moisture to collect on the upper surface of the diaphragm 5, and in order to prevent this action, I prefer to seal the space between the diaphragm, the stem 23 and the plug 7 by means of a relatively large body 32 of soft rubber having sufficient compressibility or resiliency to permit the diaphragm to function in the manner above described. In this connection it may be pointed out that the entire range of movement of the diaphragms need not be over a sixty-fourth of an inch, so that the presence of this body of rubber and its action on the stem will not materially interfere with the operation of the valve.

When this valve is to be placed under direct thermostatic control, the cap 28, spring 27 and nut 30 are removed, and a bellows 33, Fig. 3, is screwed on to the upper end of the stem 23, this bellows being connected through a capillary tube 34 with a bulb (not shown) which is placed in the refrigerator or located at any other suitable point in the system, this bellows, tube and bulb unit being exactly like those commonly used in refrigerating systems. In this arrangement the tension of the spring 26 is adjusted to aid the action of the low pressure on the diaphragm 6 to the desired degree, and the movement of the valve is produced primarily by the expansion and contraction of the fluid in the bellows 33 and by changes in fluid pressure conditions in the system. A cap 28' may enclose the thermostatic bellows and associated mechanism.

One or more holes 35 should be provided in the wall of the cap 28' to permit access to the nut 27' for the purpose of adjusting the spring 26.

The invention thus provides a regulating valve which is extremely compact, can be manufactured economically, is not liable to get out of order, and can easily be adapted for either automatic or thermostatic operation, as required. If the valve seat or the valve becomes worn, access to them may be had by unscrewing the plug 10 which normally closes the lower side of the low pressure chamber. The entire valve structure can then be unscrewed, taken out, and replaced with a new one. It is preferable to connect suitable shut-off valves directly with the inlet and outlet nipples so that the flow of refrigerant can be shut off at these points during such repairing operation. However, the volume of the refrigerant chambers in the valve is so small that relatively little air is introduced into the system by this operation. It has been found in actual practice that this valve does not frost to any objectionable degree. This non-frosting result is due to the fact that the high pressure refrigerant, which is relatively warm, is in direct contact with the diaphragms and the valve structure so that it keeps these parts at a temperature too high for frost to form on them.

While I have herein shown and described a preferred embodiment of my invention, it will be understood that the invention may be embodied in other forms without departing from the spirit or scope thereof. For example, the diaphragms 5 and 6 may be replaced with other diaphragms of the bellows type, although I prefer the disk type, as shown. These, and other changes, may be made within the spirit and scope of the invention.

Having thus described my invention, what I desire to claim as new is:

1. In a regulating valve for refrigerating systems, the combination of two flexible diaphragms, means connecting said diaphragms in opposed relationship to each other, a casing in which said diaphragms are operatively supported, said diaphragms forming opposite sides of a high pressure refrigerant chamber in said casing, whereby the pressure of said refrigerant on one diaphragm opposes that on the other, a low pressure chamber in said casing, and a valve structure connected with said diaphragms for movement by them and controlling the flow of refrigerant from the high pressure chamber to the low pressure chamber, said structure comprising a valve seat and a valve plunger cooperating with said seat.

2. In a regulating valve for refrigerating systems, the combination of a valve casing having high pressure and low pressure chambers therein for the refrigerant, two flexible diaphragms mounted in opposed relationship and forming portions of the walls of said high pressure chamber whereby the pressure on said diaphragms tends to move them in opposite directions, means connecting said diaphragms together mechanically in balancing relationship, a valve structure comprising a valve seat and a plunger cooperating with said seat, both carried by said diaphragms and controlling the flow of refrigerant from said high pressure to said low pressure chamber, and a stationary device for operating said valve upon a predetermined movement of the valve structure.

3. In a regulating valve for refrigerating systems, the combination of a valve casing having high pressure and low pressure chambers therein for the refrigerant, a flexible diaphragm separating said chambers, a valve structure connected with said diaphragm for movement therewith and controlling the flow of refrigerant from said high pressure to said low pressure chamber, said structure comprising a valve seat and a plunger for engaging said seat, a spring connected with said diaphragm and tending to move it in one direction, means for adjusting said spring, and a relatively stationary device for operating said valve due to the movements of the valve structure with said diaphragm.

4. In a regulating valve for refrigerating systems, the combination of a valve casing having high pressure and low pressure chambers therein for the refrigerant, a flexible diaphragm separating said chambers, a valve structure connected with said diaphragm for movement therewith and controlling the flow of refrigerant from said high pressure to said low pressure chamber, said structure comprising a plunger, a housing for said plunger, said housing having a valve seat in it to cooperate with said plunger, and a spring for holding said plunger yieldingly in its seat.

5. In a regulating valve for refrigerating systems, the combination of a valve casing having high pressure and low pressure chambers therein for the refrigerant, two flexible diaphragms mounted in opposed relationship and forming portions of the walls of said high pressure chamber whereby the pressure on said diaphragms tends to move them in opposite directions, means connecting said diaphragms together mechanically in balancing relationship, a valve structure controlling the flow of refrigerant from said high pressure to said low pressure chamber and connected with said diaphragms for movement with them, said structure comprising a valve seat and a plunger for engaging said seat, opposed springs connected with said diaphragms and said valve structure, at one side thereof, and tending to move the structure, and means for adjusting said springs to vary their effect on the movements of said valve due to changes in pressure in said chambers.

6. In a regulating valve for refrigerating systems, the combination of two flexible diaphragms, means connecting said diaphragms in opposed relationship to each other, a casing in which said diaphragms are operatively supported, said diaphragms forming opposite sides of a high pressure refrigerant chamber in said casing, whereby the pressure of said refrigerant on one diaphragm opposes that on the other, a low pressure chamber in said casing, a plug connecting said diaphragms, a valve structure connected with said plug and comprising a plunger and a housing for said plunger, the housing being provided with a valve seat for said plunger, said plug having a passage therethrough for conducting the high pressure refrigerant into said valve structure.

7. In a regulating valve for refrigerating systems, the combination of a valve casing having high pressure and low pressure chambers therein for the refrigerant, two flexible diaphragms mounted in opposed relationship and forming portions of the walls of said high pressure chamber whereby the pressure on said diaphragms tends to move them in opposite directions, means connecting said diaphragms together mechanically in balancing relationship, a valve structure controlling the flow of refrigerant from said high pressure to said low pressure chamber and connected with said diaphragms for movement with them, said structure comprising a valve seat, a plunger for engaging said seat, and means connected with said diaphragms and serving to move them and said valve under predetermined conditions.

RALPH N. BICKNELL.